United States Patent [19]
Hattori et al.

[11] Patent Number: 5,825,270
[45] Date of Patent: Oct. 20, 1998

[54] ELECTROMAGNETIC SOLENOID

[75] Inventors: Masaichi Hattori; Osamu Shoji, both of Aichi, Japan

[73] Assignee: Kabushiki Kaisha Tokai Rika Denki Seisakusho, Aichi, Japan

[21] Appl. No.: 740,137

[22] Filed: Oct. 22, 1996

[51] Int. Cl.⁶ .................................................. H01F 7/00
[52] U.S. Cl. ........................ 335/223; 335/274; 335/282
[58] Field of Search ................................. 335/202, 222, 335/223, 255, 274, 278, 282; 251/129.15

[56] References Cited

U.S. PATENT DOCUMENTS

| | | | |
|---|---|---|---|
| 4,294,286 | 10/1981 | Ohumi | 137/625.48 |
| 4,986,480 | 1/1991 | Llort | 292/201 |
| 5,323,133 | 6/1994 | Heath et al. | 335/222 |

FOREIGN PATENT DOCUMENTS

| | | | |
|---|---|---|---|
| 2004672 | 6/1991 | Canada | H02K 33/12 |
| 2 311 394 | 12/1976 | France | H01F 7/06 |

*Primary Examiner*—Renee S. Luebke
*Assistant Examiner*—Raymond Barrera
*Attorney, Agent, or Firm*—Morgan, Lewis & Bockius LLP

[57] ABSTRACT

The solenoid body of an electromagnetic solenoid having a pair of coil terminals to which an exciting coil is connected is movable together with a stopper plate in the direction of the arrow X and in the direction opposite to the direction of the arrow X in a casing. Each of a pair of coil springs of electrically conductive material has one end portion which is pressed against the spring supporting portion of the respective coil terminal, and the other end portion which is pressed against the inner surface of a cover, so that the electromagnetic solenoid and the stopper plate are urged towards a lock position. The coil springs includes external connecting portions to which external connecting wires are connected, so that current is supplied to the exciting coil of the electromagnetic solenoid through the coil springs.

16 Claims, 10 Drawing Sheets

ELECTROMAGNETIC SOLENOID

BACKGROUND OF THE INVENTION

1. Field of the Invention

This invention relates to an electromagnetic solenoid in which a solenoid body having an exciting coil is movable back and forth with respect to a base member.

2. Related Art

For instance, a motor vehicle employs a number of electromagnetic solenoids to switch the operating states of loads. FIG. 19 shows the arrangement of essential components in a shift lock device which employs an electromagnetic solenoid of this type. A shift lock device is generally designed as follows: when the automatic transmission is at the parking position, the ignition circuit of the motor vehicle is completed, and only when the foot brake is operated, the exciting coil of the electromagnetic solenoid is energized.

In the shift lock device shown in FIG. 19, a lock plate 1 is moved in the direction of the arrow B when a shift position switching shift lever (not shown) is depressed, and in the direction which is opposite to the direction of the arrow B when the shift lever is released; that is, the lock plate is moved up and down in response to the operation of the shift lever. The device further comprises a base member 2, and a stopper plate 3 having a stopper piece 3*a* at one end. The stopper plate 3 is designed as follows: The stopper piece 3*a* is movable between a lock position (as shown in the part (a) of FIG. 19) where the stopper piece 3*a* prevents the movement of the lock plate in the direction of the arrow B, and an unlock position (as shown in the part (b) of FIG. 19) where the stopper piece 3*a* is permitted to move in the direction of the arrow A.

An electromagnetic solenoid 4 is fixedly coupled to the stopper plate 3. More specifically, the electromagnetic solenoid 4 comprises: a solenoid body 5 secured to the stopper plate 3; and a plunger 6 which is supported by the solenoid body 5 in such a manner that it is axially movable.

The solenoid body 5 comprises: a plastic bobbin 7; an exciting coil 8 wound on the bobbin 7; a yoke 9 and a coil terminal 10 secured to the bobbin 7; and a first spring member 11, which is a compression spring interposed between the bobbin 7 and the plunger 6. The first spring member 11 urges the plunger 8 in the direction opposite to the direction of the arrow A. The plunger 8 has an end portion which penetrates the yoke in the direction opposite to the direction of the arrow A. The tip end portion of the plunger 8 is secured to a cam member 12.

The cam member 12 is so positioned that, under the condition that the stopper plate 3 is at the lock position and the plunger 6 is abutted against the yoke 9 (as shown in the part (a) of FIG. 19), its cam surface is confronted with the front end of the lock plate 1 from below. Hence, as the lock plate 1 is moved in the direction of the arrow B, its front end is abutted against the cam surface of the cam member 12, so that the lock plate applies a force through the cam surface to the cam member 12 to move the latter 12 in the direction of the arrow B.

The coil terminal 10 has two end portions 10*a* and 10*b*. The end portion 10*a* is projected from the lower end of the bobbin, and electrically connected to the exciting coil 8. The other end portion 10*b* is protruded upwardly from the bottom of a recess formed in the bobbin, and electrically connected to a flexible wire 14 through a connector fitted in the recess. When, in the shift lock device thus constructed, current is applied to the exciting coil 8, the plunger 6 is maintained attracted by the yoke 9; that is, the movement of the plunger 6 with respect to the solenoid body 5 is inhibited.

A second spring member 15 is interposed between the stopper plate 3 and a spring receiver 2*a* coupled to the base member 2, to urge the stopper plate 3 in the direction opposite to the direction of the arrow A (hereinafter referred to as "a lock position direction", when applicable) at all times.

The elastic force of the second spring member 15 is so selected that it is larger than that of the first spring member 11, but smaller than the resultant force of the first spring member 11 and the force of attraction of the electromagnetic solenoid 4 which is applied to the plunger 6.

When, in the shift lock device as shown in the part (a) of FIG. 19, the lock plate 1 is moved in the direction of the arrow B (hereinafter referred to as "an operating direction", when applicable) in response to the depression of a detent knob (not shown), the front end of the lock plate 1 is abutted against the cam surface of the cam member 12 (producing a cam action), to drive the latter 12 in the direction of the arrow A. This cam-member drive force is transmitted to the plunger 6 coupled to the cam member 12.

If, in this case, the exciting coil 8 of the electromagnetic solenoid 4 has been energized, the plunger 6 is attracted by the yoke 9, so that the movement of the plunger 6 with respect to the solenoid body is inhibited. As was described before, the elastic force of the second spring member 15 adapted to urge the stopper plate 3 and the solenoid body 5 in the lock position direction (in the direction opposite to the direction of the arrow A) is smaller than the resultant force of the force of attraction of the electromagnetic solenoid 4 which is applied to the plunger 6 and the elastic force of the first spring member 11 urging the plunger 6 in the lock position direction (in the direction opposite to the direction of the arrow A). Hence, as shown in the part (b) of FIG. 19, the whole electromagnetic solenoid 4 and the stopper plate 3 are moved in the direction of the arrow A (hereinafter referred to as "an unlock position direction", when applicable) against the elastic force of the second spring member 15.

As a result, when the lock plate 1 is moved in the direction of the arrow B in response to the depression of the detent knob, the stopper plate 3 is retracted from the locus of movement of the lock plate 1, so that the lock plate 1 is allowed to move in the direction of the arrow B as shown in the part (b) of FIG. 19; that is, the depression of the detent knob is effective.

On the other hand, in the case where, when the detent knob is depressed, the electromagnetic solenoid is not energized yet, the plunger 6 of the electromagnetic solenoid is movable with respect to the solenoid body 5. In this case, as was described before, the elastic force of the first spring member urging the plunger 6 in the lock position direction (in the direction opposite to the direction of the arrow A) is smaller than the elastic force of the second spring member 15 adapted to urge the solenoid body 5 in the lock position direction (in the direction opposite to the direction of the arrow A). Hence, when the drive force provided in response to the depression of the detent knob is transmitted through the cam member 12 to the plunger 6, as shown in the part (c) of FIG. 19 only the cam member 12 and the plunger 6 are moved in the direction of the arrow A (hereinafter referred to as "an unlock position direction", when applicable), while the solenoid body 5 and the stopper plate 3 remain held at the lock position.

Hence, when the lock plate 1 is moved in the direction of the arrow B in response to the operation of the detent knob, the front end of the lock plate 1 is abutted against the stopper piece 3a to inhibit the movement of the lock plate 1; that is, the further depression of the detent knob is ineffective.

In the above-described device, in order to supply current to the exciting coil 8 of the solenoid body which is movable, flexible wires 14 are employed as connecting lines. Hence, as the solenoid body 5 is moved, the flexible wires 14 are also moved. Therefore, it is necessary to provide a certain space for the movement of the flexible wires 14. On the other hand, since the wires 14 are connecting wire, they should be high not only in durability but also in flexibility. This is one of the factors which increase the manufacturing cost.

SUMMARY OF THE INVENTION

In view of the foregoing, an object of the invention is to provide an electromagnetic solenoid in which current can be supplied to the exciting coil without the use of the flexible wires, which reduces not only the size but also the manufacturing cost of the electromagnetic solenoid.

The foregoing object of the invention has been achieved by the provision of an electromagnetic solenoid which, according to the invention, comprises: a base member; a solenoid body having a bobbin and an exciting coil wound on the bobbin, the solenoid body being movable in a predetermined direction with respect to the base member; a plunger which is so arranged in the solenoid body that the plunger is axially movable; coil terminals fixedly provided on the solenoid body, the coil terminals having coil connecting portions to which the ends of the exciting coils are connected; and electrically conductive spring members arranged between the base member and the coil terminals in such a manner that first ends of the spring members are in contact with the coil terminals, respectively, and the remaining second ends of the spring members have external connecting portions.

In the electromagnetic solenoid, the coil terminals may have fixing portions to which the first ends of the spring members are fixedly secured, respectively.

In the electromagnetic solenoid of the present invention, the solenoid body having the exciting coil is movable with respect to the base member, and current is supplied to the exciting coil through the electrically conductive spring members arranged between the base member and the coil terminals to which the exciting coil is connected. Hence, the external connecting wires can be connected to the external connecting portions of the spring members which are held stationary. Therefore, electromagnetic solenoid of the invention, unlike the conventional one in which it is necessary to connect the flexible wires to the coil terminals which are moved together with the solenoid body, dispenses with the provision of a space for the movement of the connecting wires, and is free from the difficulty that the connecting wires are broken; that is, it is unnecessary for the electromagnetic solenoid of the invention to employ expensive flexible wires.

In the electromagnetic solenoid of the present invention, the end portions of the spring members are fixed with the fixing portions of the coil terminals, so that the spring members and the coil terminals are more positively electrically connected to each other.

BRIEF DESCRIPTION OF THE DRAWING(S)

Figure 7:
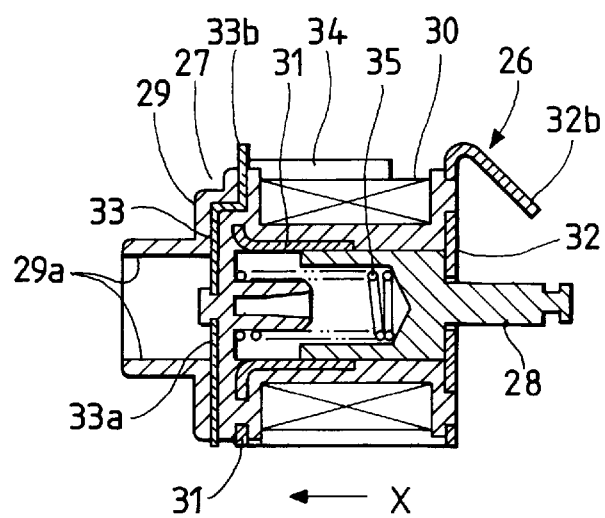
FIG. 7, is a longitudinal sectional view of an electromagnetic solenoid in the first embodiment of the invention.
Figure 8:
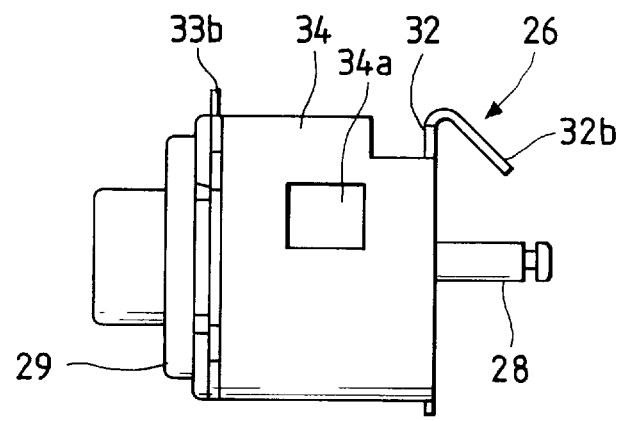
FIG. 8 is a side view of the electromagnetic solenoid shown in FIG. 7.
Figure 9:
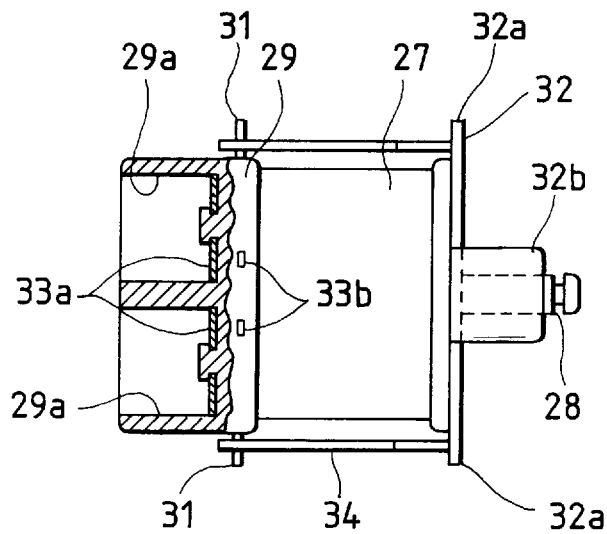

FIG. 9 a plan view, with parts cut away, of the electromagnetic solenoid shown in FIG. 7.

Figure 10:
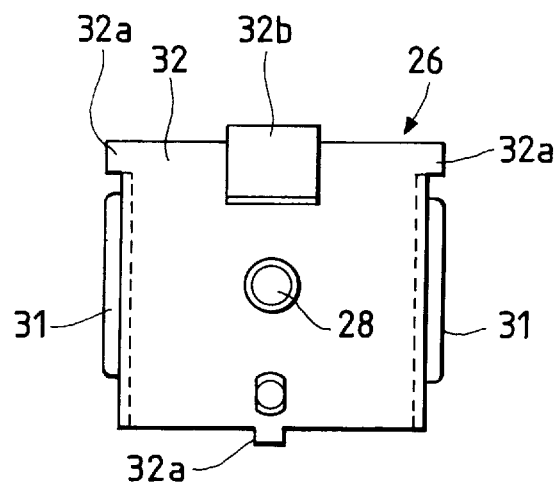
Figure 11:
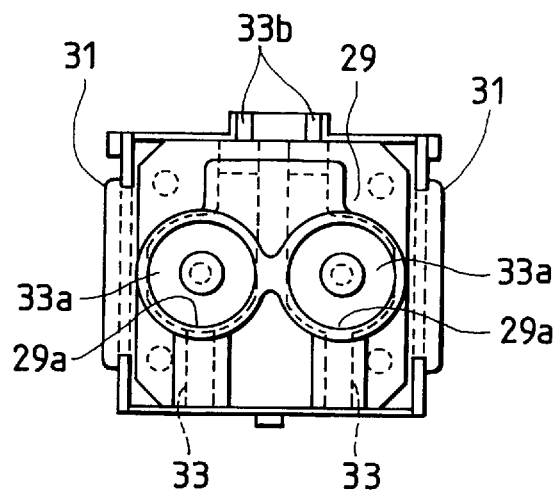

FIGS. 10 and 11 are a front view and a rear view, respectively, showing the electromagnetic solenoid shown in FIG. 7.

Figure 12:
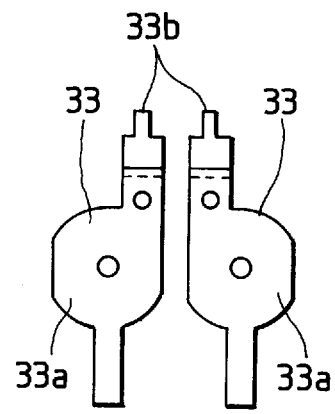

FIG. 12 is a plan view showing a pair of coil terminals.

Figure 13:
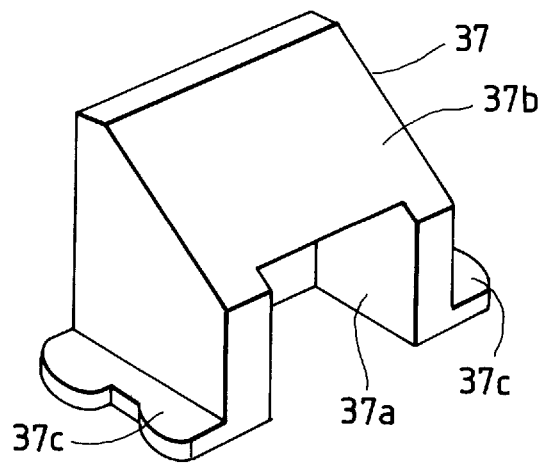
Figure 14A:
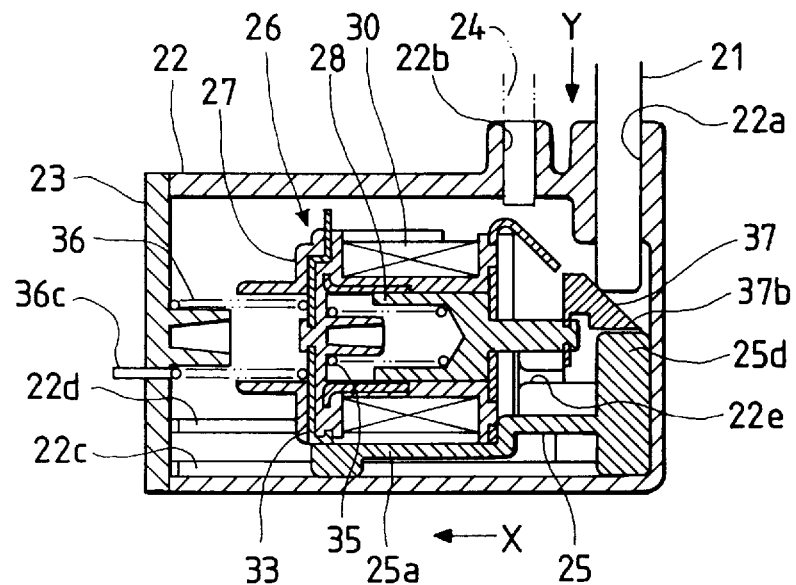
Figure 14B:
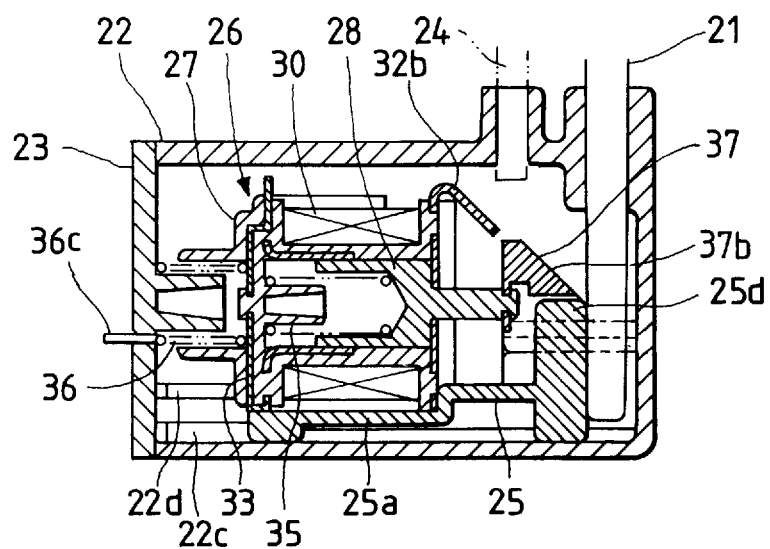
Figure 14C:
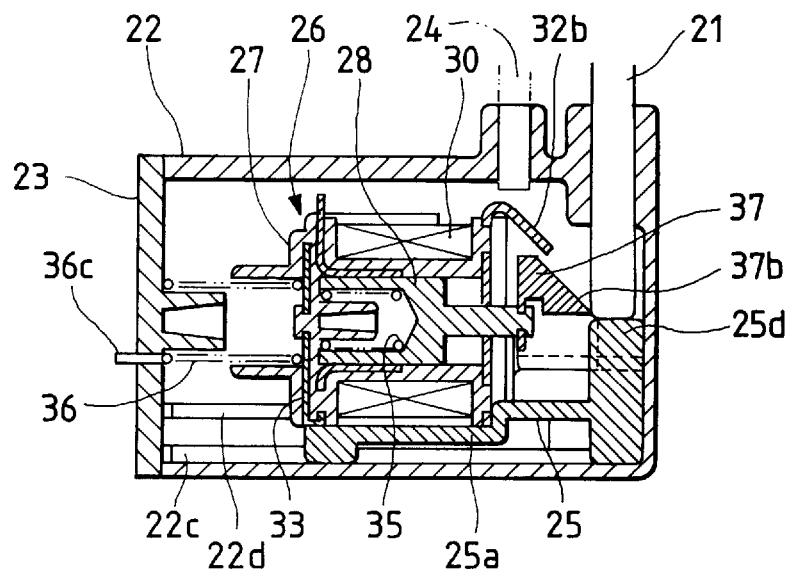
Figure 14D:
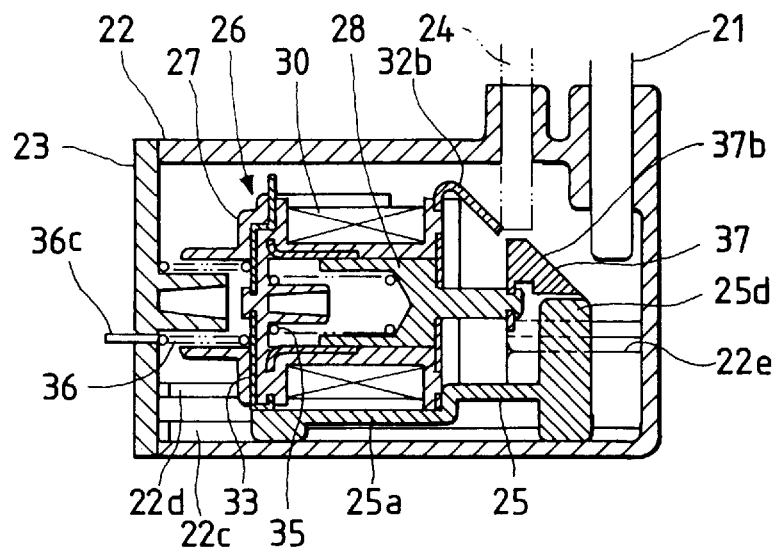

FIG. 13 is a perspective view showing a cam member in the first embodiment of the invention.

The parts (a) through (d) of FIG. 14 are vertical sectional views for a description of the operation of the first embodiment of the invention.

Figure 15:
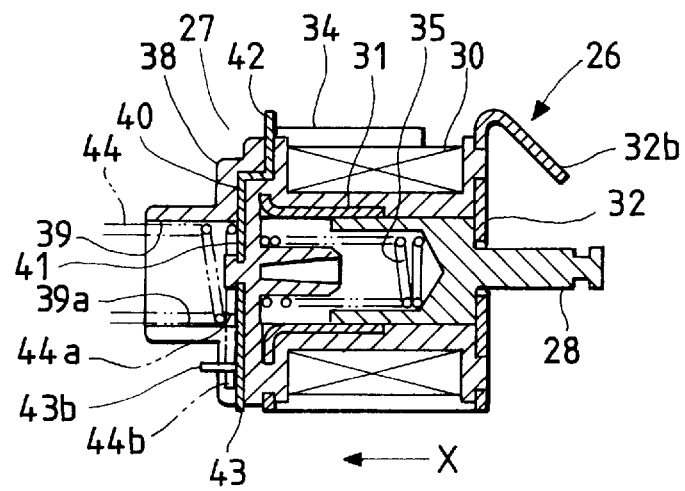

FIG. 15 a vertical sectional view of another example of the electromagnetic solenoid, which constitutes a second embodiment of the invention.

Figure 16:
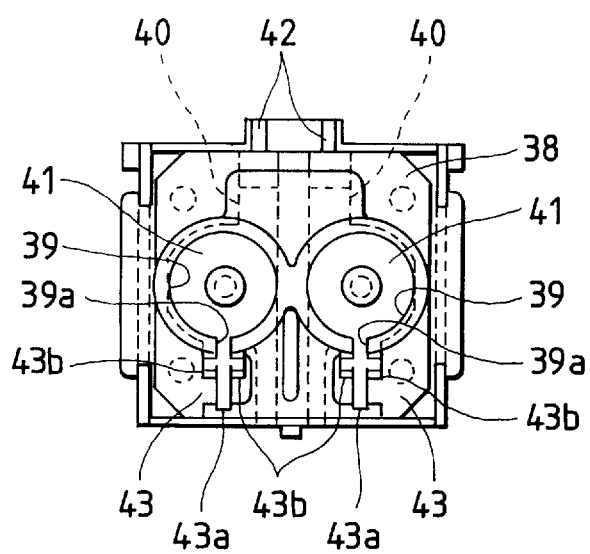

FIG. 16 is a rear view of the electromagnetic solenoid shown in FIG. 15.

Figure 17:
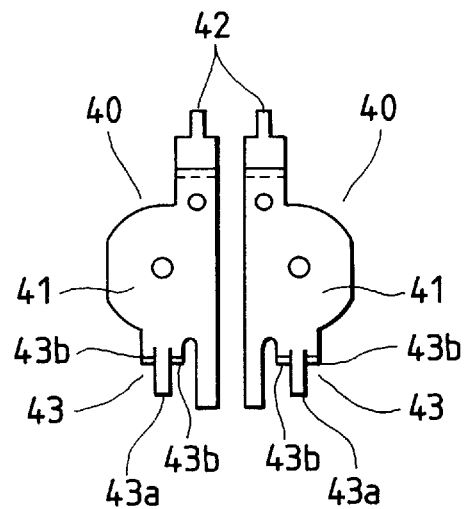

FIG. 17 a plan view of a pair of coil terminals in the electromagnetic solenoid shown in FIG. 15.

Figure 18:
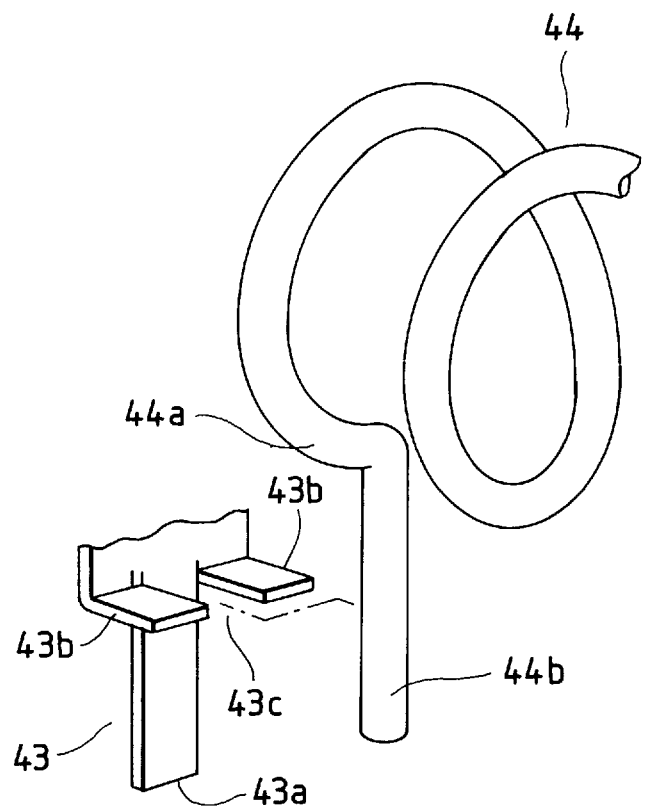

FIG. 18 is an explanatory diagram for a description of a method of fixedly connecting an exciting coil to the coil terminal in the second embodiment of the invention.

Figure 19A:
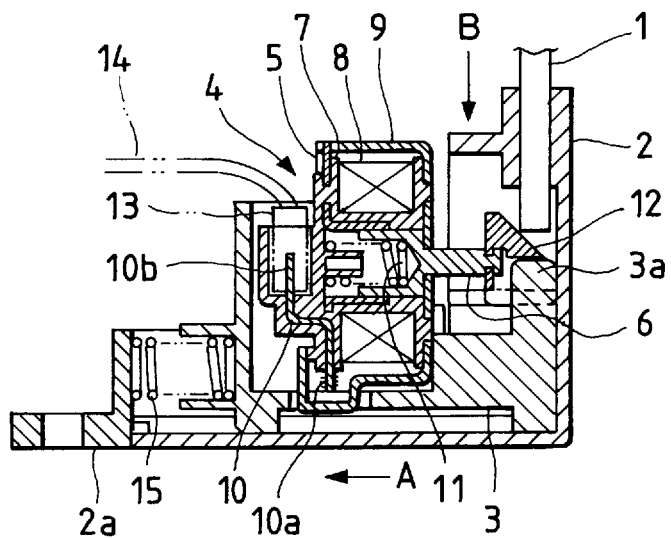
Figure 19B:
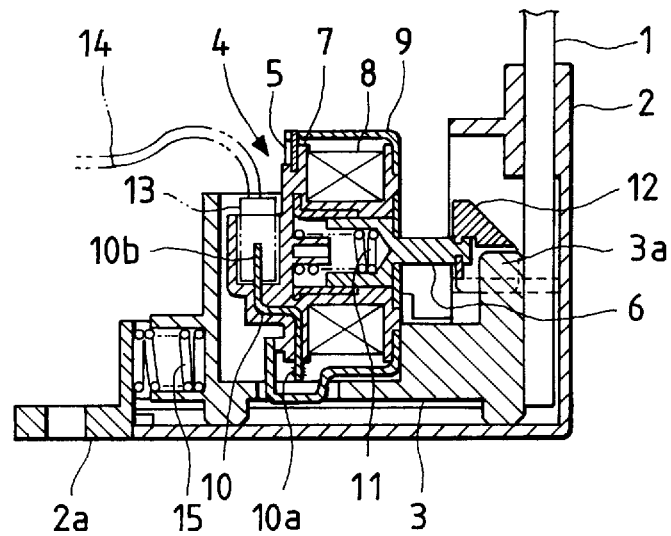
Figure 19C:
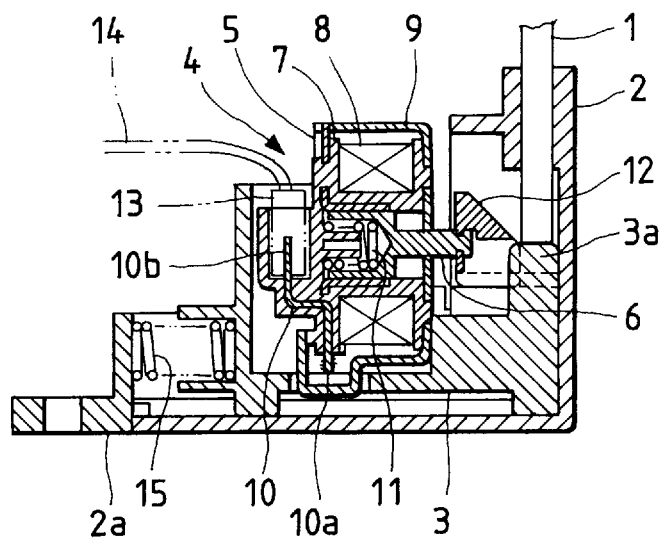

The parts (a) through (c) of FIG. 19 are vertical sectional views for a description of the operation of a shift lock device using a conventional electromagnetic solenoid.

DETAILED DESCRIPTION OF THE PREFERRED EMBODIMENTS

First Embodiment

An example of an electromagnetic solenoid applied to a shift lock device in a motor vehicle, which constitutes a first embodiment of the invention, will be described with reference to FIGS. 1 through 14.

Figure 1:
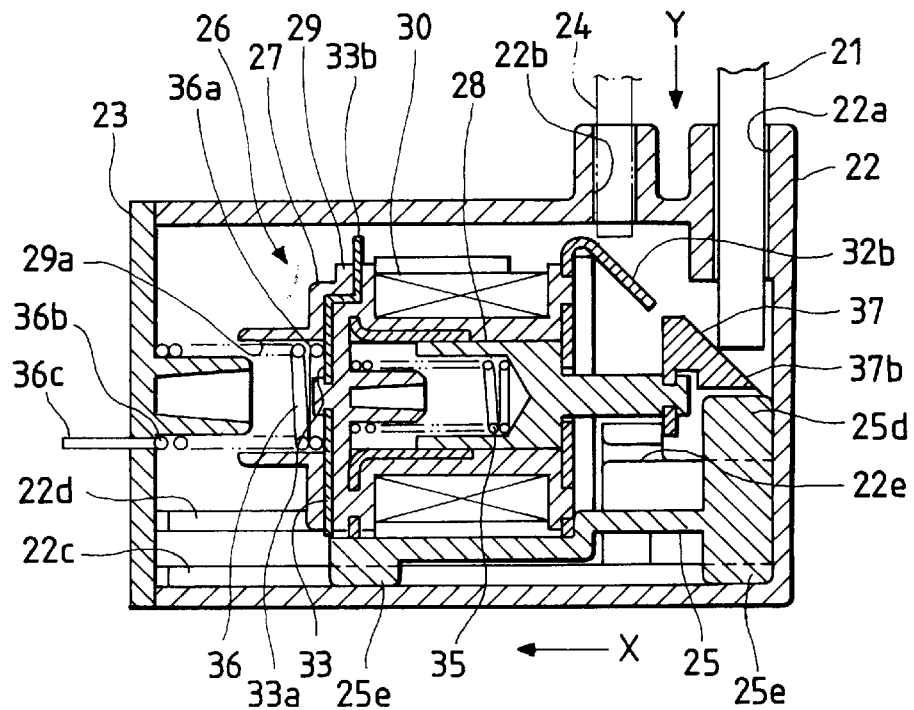
FIG. 1 is a vertical sectional side view of a shift lock device with an example of an electromagnetic solenoid, which constitutes a first embodiment of the invention.
Figure 2:
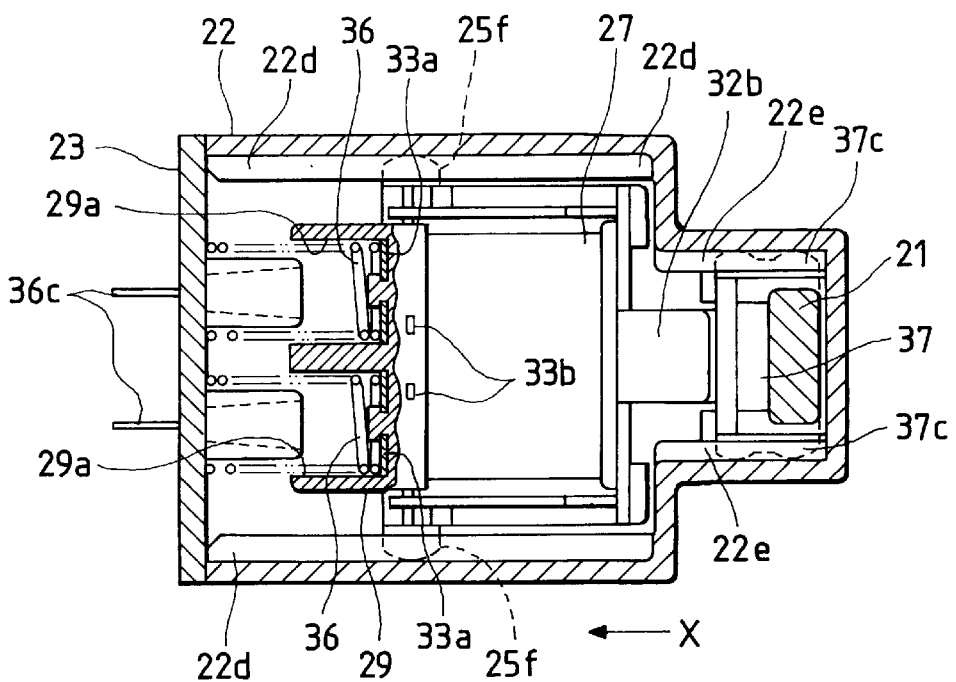
FIG. 2 is a horizontal sectional plan view of the first embodiment of the invention.
Figure 3:
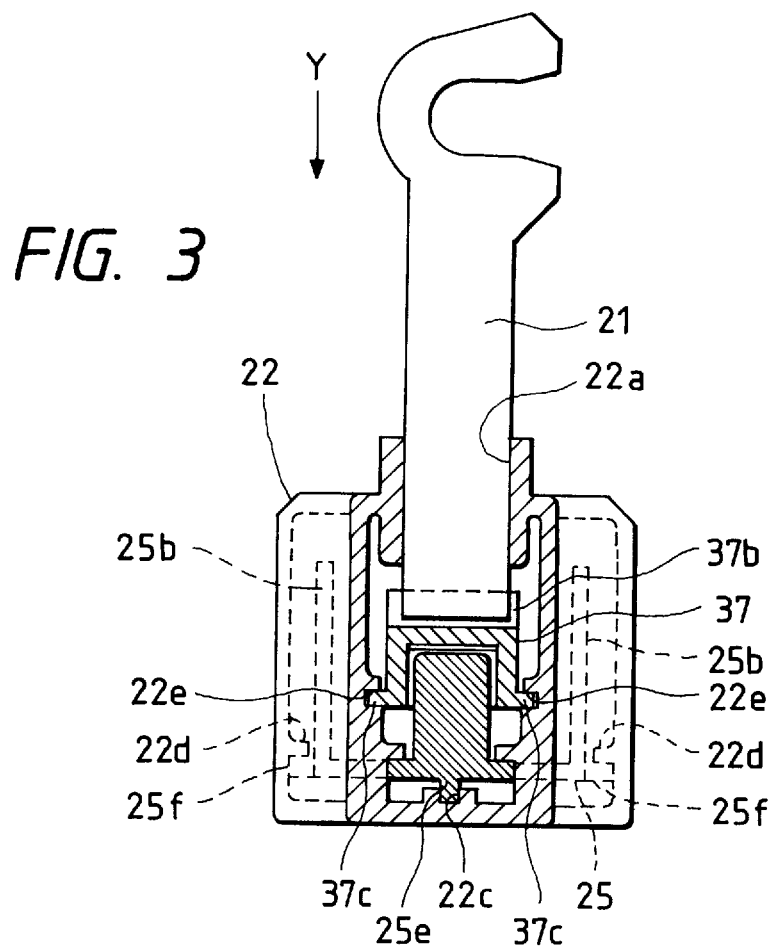
FIG. 3 is a vertical sectional front view of the first embodiment of the invention.
Figure 4:
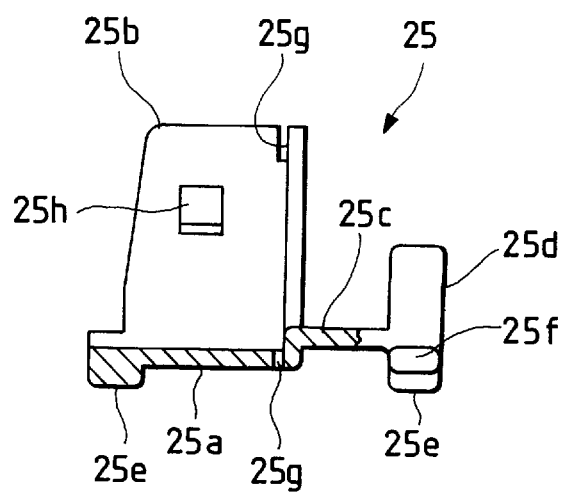
FIG. 4 is a side view, with parts cut away, showing a stopper plate in the first embodiment of the invention.
Figure 5:
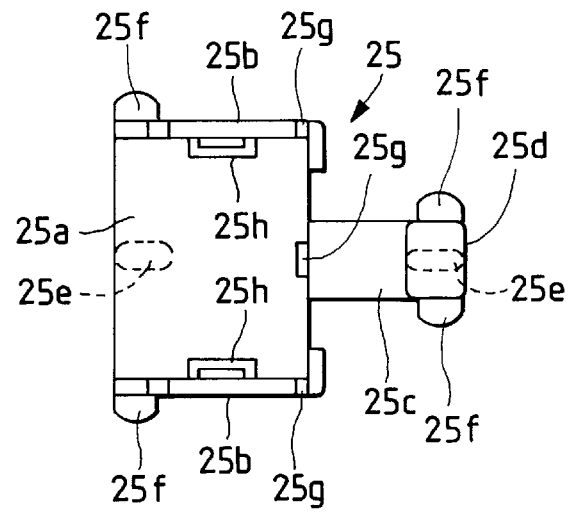
FIGS. 5 and 6 are a plan view and a front view of the stopper plate shown in FIG. 4, respectively.
Figure 6:
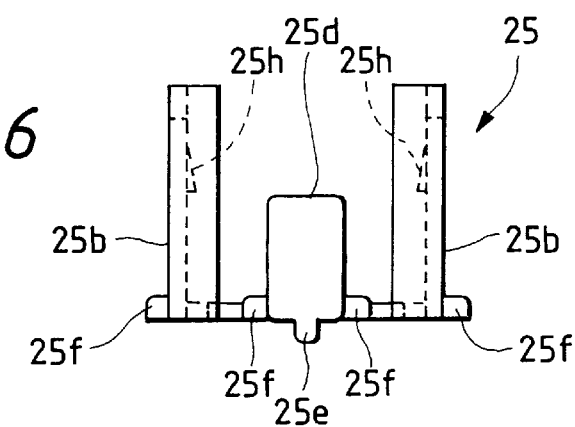

In FIGS. 1 through 3, reference numeral 21 designates a lock plate which is movable longitudinally (vertically in FIGS. 1 and 3). More specifically, the lock plate 21 is reciprocated vertically (in the direction of the arrow Y and in the direction opposite to the direction of the arrow Y) as a conventional detent knob is depressed and released which an automatic transmission shift lever has.

Further in FIGS. 1 through 3, reference numeral 22 designates a casing having an opening in its one side which is closed with a cover 23. The casing 22 and the cover 23 form the base member of the electromagnetic solenoid of the invention. The casing 22 has a guide hole 22a and a throughhole 22b in the upper surface, into which the above-described lock plate 21 and a cancel pin 24 are inserted, respectively.

A stopper plate 25 is provided on the bottom of the casing 22 in such a manner that it is movable in directions perpendicular to the direction of movement of the lock plate 21 (i.e., in the direction of the arrow X and in the direction opposite to the direction of the arrow X in FIGS. 1 and 2).

The configuration of the stopper plate 25 will be concretely described with reference to FIGS. 4 through 6, and FIG. 14 when necessary.

The stopper plate 25 essentially comprises: a rectangular plate portion 25a; a pair of walls 25b and 25b which are raised from both sides of the rectangular plate portion 25a (as viewed in the direction opposite to the direction of the arrow X); an arm 25c extended from the end of the plate portion 25a (as viewed in the direction opposite to the direction of the arrow X); and a stopper piece 25d in the form of a vertical rectangular bar which is extended from the outer end of the arm 25c. The stopper plate 25 is movable between a lock position (as shown in FIGS. 1 and 2, and the parts (a) and (c) of FIG. 14) where the stopper piece 25d is confronted with the end of the lock plate 21 from below and an unlock position (as shown in the parts (b) and (d) of FIG. 14) where the stopper piece 25d is retracted from the locus of movement of the end of lock plate.

The stopper plate 25 further comprises a pair of legs 25e which are arranged in one line. More specifically, one of the legs 25e is extended from the middle of the edge of the lower surface of the plate portion 25a of the stopper plate 25, and the other leg 25e is extended from the middle of the lower surface of the stopper piece. Those legs 25e are slidably inserted in a guide groove 22c (cf. FIGS. 1 and 3) which is formed in the bottom of the casing 22 in such a manner that it is extended along the central axis of the bottom, in the direction of the arrow X (or in the direction opposite to the direction of the arrow X). Four guiding protrusions 25f are extended from both sides of the plate portion 25a of the stopper plate 25 and both sides of the stopper piece 25d, respectively. Those protrusions 25f are set slidably in contact with a pair of guiding ribs 22d (cf. FIGS. 1 through 3) from below which are formed on two opposite side walls of the casing in such a manner that they are extended in the direction of the arrow X (or in the direction opposite to the direction of the arrow X).

Furthermore, the stopper plate 25 has two slits 25g respectively in the upper edge portions of its two walls 25b, and another slit 25g in the junction of the plate portion 25a and the arm 25c, in such a manner that those three slits are arranged in one line. The slits 25g are utilized to fixedly secure an electromagnetic solenoid 26 (described later). The stopper plate 25 further comprises a pair of pawls formed on the inner surfaces of the walls 25b, which are also utilized for fixedly securing the electromagnetic solenoid 26.

Now, the construction of the electromagnetic solenoid 26 will be concretely described with reference to FIGS. 7 through 12.

The electromagnetic solenoid 26 comprises a solenoid body 27 secured to the stopper plate 25; and a plunger 28 which is supported by the solenoid body 27 in such a manner that it is movable axially (back and forth). The solenoid body 27 comprises: a bobbin 29 of plastic material; an exciting coil 30 wound on the bobbin 29; yokes 31 and 32 secured to the bobbin; a pair of coil terminals 33 which are also secured to the bobbin 29; a casing 34 surrounding the bobbin 29, serving also as a yoke; and a compression coil spring, namely, a trip spring 35 interposed between the bobbin 29 and the plunger 28. The trip spring 35 urges the plunger 28 towards the yoke 32 (in the direction opposite to the direction of the arrow X) so that the base end portion of the plunger abuts against the yoke 32, and the outer end portion of the plunger 28 is protruded from the yoke 32.

As shown in FIG. 12, the coil terminals 33 have spring supporting portions 33a, and coil connecting portions 33b to which both ends of the exciting coil 30 are connected, respectively. As shown in FIG. 11, the coil terminals 33 together with the yoke 31 are made integral with the bobbin 29 by insert molding.

In addition, the bobbin 29 has a pair of cylindrical spring guides 29a in such a manner that the spring guides 29a are in parallel with each other. Coil springs 36 (described later), corresponding to spring members in the invention, are inserted into the spring guides 29a. In the bottoms of the spring guides 29a, the spring supporting portions of the coil terminals 33 appear (being exposed).

When, in the electromagnetic solenoid thus designed, current is applied to the exciting coil 30, the plunger 28 is attracted by the yoke 32; that is, the movement of the plunger 28 with respect to the solenoid body 27 is inhibited. In addition, the electromagnetic solenoid is so designed that current is applied to the exciting coil only when, with the automatic transmission at the parking position, the ignition circuit of the motor vehicle is completed, and the foot brake is operated.

Both side walls of the casing 34 of the electromagnetic solenoid 26 have a pair of windows 34a (only one of them shown in FIG. 8) which are engaged with the pair of pawls 25h, respectively, which are formed on both side walls of the stopper plate. Furthermore, in the electromagnetic solenoid 26, the yoke 32 has three pawls 32a (cf. FIGS. 9 and 10) which are engaged with the three slits 25g, respectively, which have been formed in the stopper plate 25. In addition, the yoke 32 includes a cam plate 32b which is inclined towards the plunger; that is, the distance between the cam plate 32b and the plunger 28 is smaller towards the outer end of the latter.

The electromagnetic solenoid 26 is secured to the stopper plate 25 as follows: The solenoid body 27 of the electromagnetic solenoid 26 is set on the plate portion 25a of the stopper plate 25, and the solenoid body 27 is held by the walls 25b of the stopper plate 25. In this operation, the windows 34a of the solenoid body 27 are engaged with the pawls 25h of the stopper plate 25, while the pawls 32a of the solenoid body 27 are engaged with the slits 25g of the stopper plate 25, so that the electromagnetic solenoid 26 is positioned in the direction of the arrow X or in the direction opposite to the direction of the arrow X. When necessary, the pawls 32a are bent to fixedly engage the slits 25g and the pawls 32a with each other, thereby to fixedly secure the electromagnetic solenoid 26 or to prevent the playing of the solenoid 26.

The cam plate 32b of the electromagnetic solenoid 26 is confronted with the end of the cancel pin 24 from below under the condition that the stopper plate 25 is at the lock position (as shown in FIGS. 1 and 2, and the part (a) and (c) of FIG. 14).

Referring back to FIGS. 1 through 3, the bobbin 29 includes spring guides 29a, and coil springs 36 of electrically conductive material are arranged in the spring guides 29a in such a manner that they are interposed between the cover 23 and the coil terminals 33 of the electromagnetic solenoid 26, so that the stopper plate 25 is kept urged towards the lock position (in the direction opposite to the direction of the arrow X) at all times. One end portion 36a of each of the coil springs 36, on the side of the coil terminal, is pressed against the spring supporting portions 33a of the respective coil terminal 33, while the other end portion 36b, on the side of the cover 23, is pressed against the inner surface of the cover 23. The other end portion 36b includes an external connecting portion 36c which is linear. The external connecting portion 36c penetrates the cover 23, thus appearing outside. The external connecting portions 36c and 36c are soldered to external connecting lines, such as those extended from the wiring pattern of a printed circuit board, and lead wires, so that current is applied to the exciting coil 30 of the electromagnetic solenoid 26 through the coil springs 36 and the coil terminals 33.

The resultant elastic force of the two coil springs 36 is greater than the elastic force of the trip spring 35, but smaller than the resultant force of the elastic force of the trip spring 35 and the force of the electromagnetic solenoid 26 which attracts and retains the plunger 28.

The end portion of the plunger 28 of the electromagnetic solenoid 26 is coupled to a cam member 37. The cam member 37 is substantially U-shaped, having a recess 37a which is engaged with the stopper piece 25d of the stopper plate 25. The upper surface of the cam member 37 is formed into a cam surface 37b which is sloped downwardly, being gradually smaller in height in the direction opposite to the direction of the arrow X.

More specifically, the cam member 37 is designed as follows: Under the condition that the stopper plate 25 is at the lock position, and the plunger 28 is abutted against the yoke 32 (as shown in FIGS. 1 and 2, and the part (a) of FIG. 14), the cam surface 37 is confronted with the end of the lock plate 21 from below. Hence, when the lock plate 21 is moved in the direction of the arrow Y, its end abuts against the cam surface 37b, producing a cam action, so that a force is applied to the cam member 37 to move the cam member 37 in the direction of the arrow X.

The cam member 37 has a pair of guiding ears 37c on both sides. Those guiding ears 37c are slidably engaged with a pair of guide grooves 22e, respectively (cf. FIGS. 1 through 3) which are formed in two opposite side walls of the casing 22 in such a manner that they are extended in the direction of the arrow X (or in the direction opposite to the direction of the arrow X).

The operation of the first embodiment thus designed will be described mainly with reference to FIG. 14.

The stopper plate 25 together with the solenoid body 27 of the electromagnetic solenoid 26, being urged towards the lock position (as shown in the parts (a) and (c) of FIG. 14) by the elastic forces of the coil springs 36, is normally held at the lock position. On the other hand, the cam member 37 together with the plunger 28 of the electromagnetic solenoid 26 is urged towards the lock position of the stopper plate 25 by the elastic force of the trip spring 35, so that its cam surface 37b is confronted with the end of the lock plate 21 (as shown in the part (a) of FIG. 14).

When, under this condition, the lock plate 21 is moved in the operating direction (or in the direction of the arrow Y) in response to the depression of the detent knob (not shown), the end of the lock plate 21 is abutted against the cam surface 37b of the cam member 37, thus producing a cam action. As a result, a force is applied to the cam member 37 in the direction of the arrow X, and the force of movement of the cam member 37 is transmitted to the plunger 28 coupled to the cam member 37.

In the case where, at the time of depression of the detent knob, current has been applied to the exciting coil 30 of the electromagnetic solenoid 26 through the coil springs 36 and the coil terminals 33, the plunger 28 is attracted by the yoke 32, so that the movement of the plunger 28 with respect to the solenoid body 27 is inhibited. In this case, the resultant force of the elastic forces of the coil springs 36 urging the solenoid body 27 is larger than the resultant force of the force of attraction of the electromagnetic solenoid 26 which is applied to the plunger 28, and the elastic force of the trip spring 35 urging the plunger 28 towards the lock position. Hence, when the force of movement is applied to the plunger 28 in response to the depression of the detent knob, as shown in the part (b) of FIG. 14 the whole electromagnetic solenoid 26, and the stopper plate 25 fixedly secured to the solenoid body 27 of the electromagnetic solenoid 26 are moved to the unlock position (in the direction of the arrow X) against the elastic forces of the coil springs 36.

As a result, when the lock plate 21 is moved in the direction of the arrow Y in response to the depression of the detent knob, the stopper plate 25 is held retracted from the locus of movement of the lock plate 21, thus permitting the movement of the lock plate 21 in the direction of the arrow Y; that is, the depression of the detent knob becomes effective.

On the other hand, in the case where no current is applied to the electromagnetic solenoid 26 (the ignition circuit is not completed, or the foot brake is not operated) although the detent knob is depressed, the plunger 28 of the electromagnetic solenoid 26 is movable with respect to the solenoid body 27. In this case, the elastic force of the trip spring 35 urging the plunger 28 towards the lock position is smaller than the resultant force of the elastic forces of the coil springs 36 urging the solenoid body 27 towards the lock position. Hence, when the force of movement is transmitted to the plunger 28 through the cam member 37 in response to the depression of the detent knob as was described before, only the cam member 37 and the plunger 28 are moved towards the unlock position (in the direction of the arrow X) against the elastic force of the trip spring 35, and the stopper plate 25, to which solenoid body 27 is fixedly secured, is maintained held at the lock position.

Hence, when the lock plate 21 is moved in the direction of the arrow Y in response to the depression of the detent knob, as shown in the part (c) of FIG. 14 the end of the lock plate is abutted against the stopper piece 25d of the stopper plate, thus inhibiting the movement of the lock plate. Hence, the further depression of the detent knob become ineffective.

In the case where it is required to make the depression of the detent knob effective although current cannot be applied to the exciting coil 30 of the electromagnetic solenoid 26 for some reason, the detent knob should be depressed with the cancel pin 24 depressed. That is, with the cancel pin 24 depressed, the end of the cancel pin 24 abuts against the cam plate 32b of the electromagnetic solenoid 26, thus producing a cam action. As a result, a force is applied to the electromagnetic solenoid 26 to move the solenoid 26 in the direction of the arrow X. Therefore, as shown in the part (d) of FIG. 14, the stopper plate 25 is moved to the unlock position, so that the depression of the detent knob becomes effective.

As was described above, in the first embodiment, the solenoid body 27 having the exciting coil 30 is movable back and forth with respect to the casing 22, and current is supplied to the exciting coil 30 through the electrically conductive coil springs 36 which are arranged between the cover 23 and the coil terminals 33 to which the exciting coil 30 is connected. Hence, the external connecting wires may be connected to the external connecting portions 36c of the coil springs 36 which have been fixedly secured. Hence, the electromagnetic solenoid of the invention, unlike the conventional one in which the flexible wires are connected to the coil terminals which are moved together with the solenoid body, dispenses with the provision of a space for the movement of the connecting wires, and is free from the difficulty that the connecting wires are broken; that is, it dispenses with the employment of expensive flexible wires. This feature makes it possible to miniaturize the electromagnetic solenoid of the invention, and to decrease the manufacturing cost as much.

Second Embodiment

FIGS. 15 through 18 show essential components of another example of the electromagnetic solenoid in a shift lock device, which constitutes a second embodiment of the invention. The second embodiment has substantially the same effects as the first embodiment.

For simplification in description, only the parts of the second embodiment which are different from those of the first embodiment will be described.

In FIGS. 15 through 18, reference numeral 26 designates the electromagnetic solenoid. As shown in FIGS. 15 and 16, the electromagnetic solenoid 26 has a bobbin 38 including cylindrical spring guides 39. The spring guides 39 have slits 39a in the lower walls in such a manner that they are extended axially (in the direction of the arrow X, or in the direction opposite to the direction of the arrow X). Tie electromagnetic solenoid 26 further includes a pair of coil terminals 40 as shown in FIG. 17 which are formed by using a flat plate material. Each of the coil terminals 40 comprises: a spring supporting portion 41; a coil connecting portion 42 to which an end of an exciting coil 30 is connected; and a spring fixing portion 43 on one side of the spring supporting portion which is opposite to the other side where the coil connecting portion 42. The spring fixing portion 43 is formed by cutting and raising the flat plate material. More specifically, the spring fixing portion 43 includes a protruded piece 43a which is extended downwardly, and a pair of L-shaped bent pieces 43b and 43b on both sides of the protruded piece 43a.

One end portion 44a of each of coil springs 44 (corresponding to spring members in the invention) on the side of the coil terminal 40 which are adapted to urge the solenoid body 27 of the electromagnetic solenoid 26, includes a coil terminal connecting portion 44b which is linear and extended radially outwardly (cf. FIG. 18). The other end portion (not shown) of the coil spring 44 includes a linear external connecting portion which penetrates the cover 23 and appears outside (being exposed) similarly as in the above-described first embodiment.

The coil terminal connecting portion 44b of each of the coil springs 44 is inserted through the slit 39a of the spring guide 39 into a groove 43c which is formed by the pair of bent pieces 43b of the spring fixing portion 43 (cf. FIG. 18). Under this condition, one end portion 44a of the coil spring 44 is brought into contact with the spring supporting portion 41 of the coil terminal 40, while the coil terminal connecting portion 44b is arranged on the protruded piece 43b of the spring fixing portion 43. Thereafter, the bent pieces 43b are crimped to hold the coil terminal connecting portion 44b between them. Under this condition, the bent pieces 43b are fixedly secured to the coil terminal connecting portion by soldering. Thus, the coil spring 44 has been fixedly secured to the coil terminal 40. In this case, the bent pieces 43b may be fixedly secured to the coil terminal connecting portion by fusing (electrical welding) instead of soldering.

Hence, the second embodiment has the same effects as the first embodiment. In addition, in the second embodiment, the coil terminal connecting portions 44b of the coil springs 44 are fixedly secured by using the spring fixing portions 43 of the coil terminals 40; that is, the coil springs 44 are fixedly secured to the coil terminals 40, and the former 44 and the coil terminals 40 are positively electrically connected to each other.

As is apparent from the above description, in the electromagnetic solenoid of claim 1, the solenoid body having the exciting coil is movable with respect to the base member, and current is supplied to the exciting coil through the electrically conductive spring members arranged between the base member and the coil terminals to which the exciting coil is connected. Hence, the electromagnetic solenoid dispenses with the provision of a space for the movement of the connecting wires which is effected as the solenoid body moves, and it is free from the difficulty that the connecting wires are broken; that is, it is unnecessary for the electromagnetic solenoid to employ expensive flexible wires. This feature makes it possible to miniaturize the electromagnetic solenoid of the invention, and to decrease the manufacturing cost as much.

In the electromagnetic solenoid, the electrically conductive spring members are fixedly secured to the coil terminals; that is, the former and the latter are electrically more positively connected to each other.

What is claimed is:

1. An electromagnetic solenoid comprising:
    a bobbin having an exciting coil and a pair of spring guides;
    a plunger coupled to the exciting coil and movable along an axis of the exciting coil;
    coil terminals secured to the bobbin and having coil connecting portions connected to ends of the exciting coil; and
    a pair of electrically conductive spring members for urging the plunger in a predetermined direction and for connecting the coil terminals to external connecting portions, wherein the pair of electrically conductive spring members are attached to the coil terminals and substantially within the pair of spring guides,
    wherein a trip spring is interposed between the plunger and the bobbin.

2. The electromagnetic solenoid as claimed in claim 1, wherein first ends of the pair of electrically conductive spring members are in contact with the coil terminals, and second ends of the pair of electrically conductive spring members have external connecting portions.

3. The electromagnetic solenoid as claimed in claim 1, wherein the coil terminals having fixing portions for fixedly securing first ends of the pair of electrically conductive spring members and the plunger is attracted by a yoke when current is applied to the exciting coil.

4. The electromagnetic solenoid as claimed in claim 1, further comprising a first yoke secured to the bobbin and a second yoke secured to the bobbin, wherein the trip spring urges the plunger toward the first yoke.

5. The electromagnetic solenoid as claimed in claim 4, wherein the second yoke and the coil terminals are formed integrally with the bobbin.

6. The electromagnetic solenoid as claimed in claim 4, wherein the first yoke further comprises a cam plate inclined toward the plunger.

7. The electromagnetic solenoid as claimed in claim 1, further comprising a base member having a casing and a cover, wherein the casing has a guide hole and a through hole in an upper surface.

8. The electromagnetic solenoid as claimed in claim 7, further comprising a stopper plate at a bottom of the casing, wherein the stopper plate is movable in a direction of the axis of the exciting coil.

9. The electromagnetic solenoid as claimed in claim 8, wherein the stopper plate further comprises:
    a rectangular plate portion;
    a pair of walls raised from sides of the rectangular plate portion;
    an arm extending from an end of the rectangular plate portion;

a stopper piece extended in a vertical direction from the end of the rectangular plate portion;

a pair of legs extending downward from the rectangular plate portion;

a plurality of guiding protrusions extending from sides of the rectangular plate portion; and a first slit and a second slit in upper portions of the pair of walls, and a third slit at a junction of the rectangular plate portion and the arm.

10. The electromagnetic solenoid as claimed in claim 9, wherein the casing has a plurality of guiding ribs formed on opposite side walls of the casing and a guide groove formed in a bottom of the casing, wherein the plurality of guiding protrusions are slidably in contact with the plurality of guiding ribs, and the legs are slidably inserted into the guide groove.

11. The electromagnetic solenoid as claimed in claim 10, wherein the stopper plate further comprises a pair of pawls on the pair of walls; and wherein the casing has a pair of windows engaging the pawls.

12. The electromagnetic solenoid as claimed in claim 10, wherein the plunger is coupled to a cam member having a sloped cam surface, a recess and a pair of guiding ears for slidably engaging the guide grooves.

13. An electromagnetic solenoid, comprising:

a bobbin having a yoke and an exciting coil;

a plunger arranged within the bobbin and movable along an axis of the exciting coil;

a trip spring interposed between the plunger and the bobbin, wherein the trip spring urges the plunger toward the yoke:

coil terminals having coil connecting portions connected to ends of the exciting coil; and a pair of electrically conductive spring members for urging the bobbin toward the yoke and for connecting the coil terminals to external connecting portions, wherein the pair of electrically conductive spring members are attached to the coil terminals.

14. The electromagnetic solenoid according to claim 13, wherein first ends of the pair of electrically conductive spring members are in contact with the coil terminals, and second ends of the pair of electrically conductive spring members have the external connecting portions.

15. The electromagnetic solenoid according to claim 13, wherein the coil terminals have fixing portions for fixedly securing the first ends of the pair of electrically conductive spring members.

16. The electromagnetic solenoid according to claim 13, wherein the plunger is attracted by the yoke when current flows through the exciting coil.

* * * * *